March 6, 1956
C. H. SMOOT ET AL
2,737,600
VOLTAGE-LIMITING MEANS
Filed Sept. 8, 1950
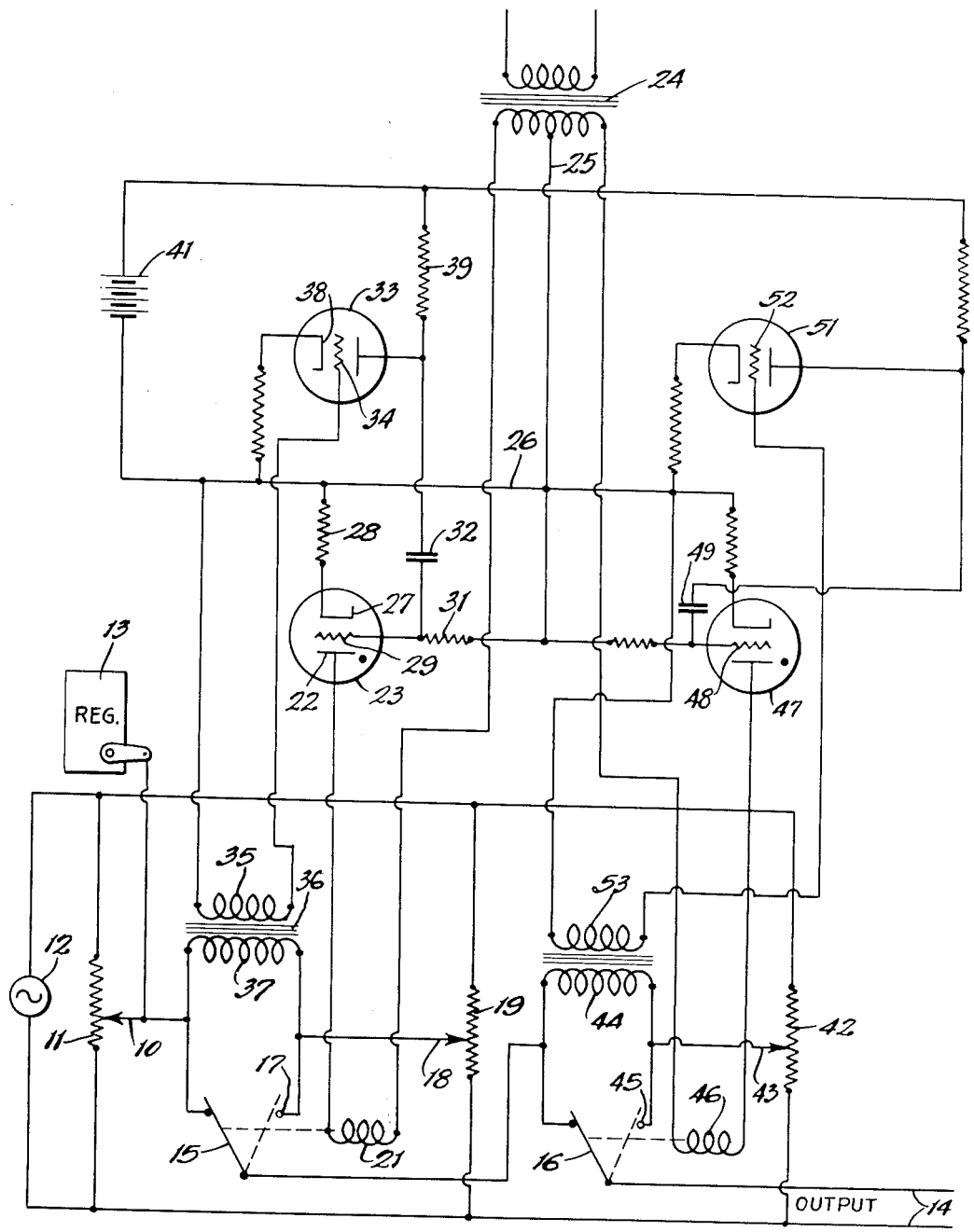
INVENTORS:
Charles H. Smoot
and Nicholas A. Philips,
BY E. S. Booth,
ATTORNEY.

United States Patent Office 2,737,600
Patented Mar. 6, 1956

2,737,600

VOLTAGE-LIMITING MEANS

Charles H. Smoot and Nicholas A. Philips, Chicago, Ill., assignors to Republic Flow Meters Company, Chicago, Ill., a corporation of Illinois Application September 8, 1950, Serial No. 183,747

7 Claims. (Cl. 307—80)

This invention relates to voltage-limiting devices, and more particularly to apparatus for limiting the maximum voltage, the minimum voltage, or both, in a signal circuit.

Many types of circuits which are responsive to an electrical signal require that the signal be maintained within predetermined limits. It is also necessary when an alternating-current signal is employed that the wave form of a signal be maintained without distortion. The copending application of Charles H. Smoot, Serial No. 59,061, filed November 9, 1948, provides one desirable apparatus for accomplishing this result, and it is a principal object of the present invention to provide a different type of device for limiting the amplitude of a signal.

Another object is to provide a voltage-limiting device in which the output circuit of the device is connected selectively to a signal input circuit for supplying a signal of varying amplitude or to a signal source of predetermined amplitude in response to the amplitude of the signal supplied by the circuit.

Another object is to provide a signal-limiting device in which the connection of the output circuit to the signal circuit or to the fixed source is controlled by electric operating means. Preferably the electric means is in turn controlled by a gas discharge tube whose conductivity is regulated in response to the amplitude of the incoming signal.

Still another object is to provide a signal-control device for an alternating-current signal in which connection of the output circuit to the signal circuit or to a source of predetermined amplitude is controlled in response to the phase of a voltage derived by interconnecting the signal circuit and the source. In the preferred construction a transformer is utilized whose primary is connected between the signal circuit and the source and whose output is amplified to control the operating means.

A still further object is to provide a voltage-control device in which the signal voltage is maintained at all times between predetermined maximum and minimum limits and when the signal tends to go beyond or below such limits the output circuit of the device is connected to either a maximum signal source or a minimum signal source.

The above and other objects and advantages of the invention will become apparent as the specification proceeds.

The single figure is a circuit diagram of a voltage-limiting device embodying the invention. In the circuit shown an alternating-current signal of varying amplitude is produced by adjusting a movable wiper 10 over a resistance 11 which is connected across an alternating-current source indicated at 12. The wiper 10 may be adjusted in any desired manner as by a regulator 13 responsive to a condition which is to be indicated or controlled. The signal whose amplitude is varied by adjustment of the wiper 10 is received by a signal circuit between the wiper 10 and the lower end of resistor 11 and is supplied to an output circuit 14 which may lead to indicating or control apparatus to indicate or control the value of the condition to which the regulator 13 responds.

One side of the output circuit 14 is connected to one side of the resistor 11, and the other side of the output circuit is connected through two selector switches 15 and 16 to the wiper 10. The switches 15 and 16 are preferably in series, as shown, and when they are in their normal positions illustrated in full lines connect the upper side of the output circuit directly to the wiper.

In the circuit illustrated, the selector switch 15 is the maximum amplitude switch and is designed to be thrown over to a contact 17 when the amplitude of the input signal exceeds a predetermined value. The contact 17 is connected to a signal source of predetermined fixed amplitude shown as an adjustable wiper 18 engaging a resistance 19 which is also connected across source 12. The wiper 18 may be manually adjusted to predetermine the maximum permissible amplitude of the signal.

The switch is adapted to be moved from its full line to its dotted-line position by an electric operating means shown as comprising a solenoid coil 21. The coil 21 is connected to the anode 22 of a gaseous discharge tube 23 at one side and at its other side is connected to one end of the secondary winding of a transformer 24. The primary of the transformer 24 is connected to an alternating-current source of the same frequency as the source 12, and which may conveniently be the source 12. The transformer secondary has a center tap 25 which is connected to a common return line 26, and the cathode 27 of the tube 23 is connected to this return line through a resistance 28. The tube 23 includes a control element such as a starter 29 connected through a resistor 31 to the return line 26 and through a blocking condenser 32 to the anode of an amplifier tube 33. The tube 33 has a control grid 34 connected to the secondary winding 35 of a transformer 36. The primary winding 37 of the transformer is connected directly between the wipers 10 and 18. The tube 33 also has a cathode 38 connected to the common return line 26 and has its anode connected through a load resistor 39 to a source of direct current illustrated as a battery 41.

With this construction when the voltage at the wiper 10 is less than that at the wiper 18 there is a tendency for current to flow from the wiper 18 through the winding 37 to the wiper 10. The voltage induced in the transformer secondary 35 will be amplified by the tube 33 and the alternating-current component will be impressed on the control element 29 of the gas tube 23. Under the conditions just described, the control element 29 will be negative at the time the anode 22 is positive so that the tube 23 will not conduct. Under these conditions the switch 15 will occupy its full-line position to connect the wiper 10 to the output circuit.

If the wiper 10 is adjusted so that its voltage is higher than that for which the wiper 18 is set, current will flow in the opposite direction through the primary winding 37 and will cause the control element 29 of the tube 23 to be positive at the same time the anode is positive. Under these conditions the tube 23 will conduct so that current will flow from the transformer 24 through the solenoid 21 to shift the switch 15 into engagement with the contact 17. At this time connection of the wiper 10 to the output circuit is interrupted and the output circuit is connected to the wiper 18 so that the predetermined maximum voltage for which the wiper 18 is set will be transmitted to the output circuit. It will be noted that the wave form derived from the wiper 18 is identical to the wave form derived from the wiper 10 so that the maximum amplitude of the signal is limited without distortion.

A similar arrangement is employed to control the switch 16 to limit the minimum permissible voltage. As shown, this comprises a source of signals of predetermined fixed amplitude shown as a resistor 42 connected across the source 12 and having an adjustable wiper 43 engaging it. The wiper 43 is connected through a transformer primary winding 44 to the switch 15 and is also connected to a terminal 45 engaged by the switch 16 when it is moved to its dotted-line position. The switch 16 is moved by electric operating means shown as a solenoid 46 connected to the other side of the secondary winding of the transformer 24 and to the anode of a gas discharge tube 47. The control grid 48 of the tube 47 is connected through a blocking condenser 49 to the anode of an amplifier tube 51 which is similar to the tube 33. The control grid 52 of the tube 51 is connected to a transformer secondary winding 53 coupled to the primary winding 44.

In operation of this part of the circuit, whenever the signal received at the left end of the winding 44 is of greater amplitude than that for which the wiper 43 is set the voltage induced in the secondary winding 53 is of such phase as to drive the control grid 48 of the tube 47 negative when the anode of the tube is positive. Thus, the tube 47 will not conduct and the switch 16 will be in the full-line position shown. When the signal is less than the amplitude for which the wiper 43 is adjusted, the phase of the voltage induced in the secondary winding 53 will be reversed so that the control grid 48 of the tube 47 will be positive at the same time the anode is positive. Thus, the tube 47 will conduct to energize the solenoid 46 and shift the switch 16 into engagement with the terminal 45. At this time the output circuit will be disconnected from the switch 15 and the wiper 10 will be connected to the wiper 43 to receive therefrom a signal whose amplitude is predetermined by adjustment of the wiper 43. Here again it will be noted that the wave form is the same as that of the original signal so that the minimum amplitude of the signal supplied to the output circuit is limited without distortion.

While one embodiment of the invention has been described in detail, it will be understood that many variations may be made by persons skilled in the art without departing from the spirit of our invention.

What is claimed is:

1. A voltage limiting device comprising a signal circuit to receive electrical signals of varying voltage amplitude, a source of electrical signals of predetermined fixed voltage amplitude, an output circuit, a selector switch to connect the output circuit selectively to the signal circuit or the source, electric operating means to operate the selector switch, an amplifier controlling the electric operating means, and a transformer having its primary connected between the signal circuit and the source in voltage opposition to each other and its secondary connected to the amplifier input to control the amplifier in response to the difference in the voltage amplitude of the signal circuit and the source.

2. A voltage limiting device comprising a signal circuit to receive alternating current signals of varying voltage amplitude, a source of alternating current signals of the same frequency as the first named signals and of predetermined fixed voltage amplitude, an output circuit, a selector switch to connect the output circuit selectively to the signal circuit or the source, electric operating means to operate the selector switch, means to connect the signal circuit and the source in phase relationship, and a control circuit for the electric operating means responsive to the phase of the current in the last named means due to differences in the relative signal amplitudes.

3. A voltage limiting device comprising a signal circuit to receive alternating current signals of varying amplitude, a source of alternating current signals of the same frequency as the first named signals and of predetermined fixed amplitude, an output circuit, a selector switch to connect the output circuit selectively to the signal circuit or the source, electric operating means to operate the selector switch, a transformer having its primary connected between the signal circuit and the source in phase relationship, and switch means responsive to the phase of the voltage developed in the transformer secondary to control the electric operating means.

4. A voltage limiting device comprising a signal circuit to receive alternating current signals of varying amplitude, a source of alternating current signals of the same frequency as the first named signals and of predetermined fixed amplitude, an output circuit, a selector switch to connect the output circuit selectively to the signal circuit or the source, electric operating means to operate the selector switch, a transformer having its primary connected between the signal circuit and the source in phase relationship, a gas discharge tube having an anode circuit connected to the electric operating means and to an alternating current source of the same frequency as the signals, and a control element in the tube connected to the transformer secondary.

5. A voltage limiting device comprising a signal circuit to receive signals of varying amplitude, a first source of signals of the desired maximum amplitude, a second source of signals of the desired minimum amplitude, an output circuit, a first selector switch to connect the output circuit selectively to the signal circuit or the first source, means responsive to the signal in the signal circuit when it exceeds said desired maximum amplitude to operate the switch to connect the output circuit to the first source, a second selector switch to connect the output circuit selectively to the signal circuit or the second source and means responsive to the signal in the signal circuit when it is less than said desired minimum amplitude to operate the second selector switch to connect the output circuit to the second source.

6. The construction of claim 5 in which the first and second selector switches are in series.

7. A voltage limiting device comprising a signal circuit to receive signals of varying amplitude, a first source of signals of the desired maximum amplitude, a second source of signals of the desired minimum amplitude, an output circuit, a first selector switch to connect the output circuit selectively to the signal circuit or the first source, a second selector switch to connect the output circuit selectively to the signal circuit or the second source, electric operating means to operate the selector switches and normally so controlled that both switches are in a position to connect the output circuit to the signal circuit, and a control circuit for the electric operating means responsive to the amplitude of the signal in the signal circuit.

References Cited in the file of this patent

UNITED STATES PATENTS

| | | |
|---|---|---|
| 1,767,582 | Fisher | June 24, 1930 |
| 1,859,069 | Beekman | May 17, 1932 |
| 1,873,970 | Marti et al. | Aug. 30, 1932 |
| 2,322,955 | Perkins | June 29, 1943 |
| 2,380,784 | Patin | July 31, 1945 |
| 2,417,272 | Short | Mar. 11, 1947 |
| 2,534,542 | Bower | Dec. 19, 1950 |